United States Patent [19]

Migdal et al.

[11] Patent Number: 5,075,383

[45] Date of Patent: * Dec. 24, 1991

[54] DISPERSANT AND ANTIOXIDANT ADDITIVE AND LUBRICATING OIL COMPOSITION CONTAINING SAME

[75] Inventors: Cyril A. Migdal, Croton-on-Hudson; Theodore E. Nalesnik; Nicholas Benfaremo, both of Wappingers Falls; Christopher S. Liu, Poughkeepsie, all of N.Y.

[73] Assignee: Texaco Inc., White Plains, N.Y.

[*] Notice: The portion of the term of this patent subsequent to Sep. 5, 2006 has been disclaimed.

[21] Appl. No.: 628,050

[22] Filed: Dec. 17, 1990

Related U.S. Application Data

[63] Continuation-in-part of Ser. No. 507,550, Apr. 11, 1990, abandoned, which is a continuation-in-part of Ser. No. 452,139, Dec. 18, 1989, abandoned.

[51] Int. Cl.$^5$ ................ C10M 105/56; C08F 255/04
[52] U.S. Cl. .................... 525/293; 525/301; 525/304; 525/232; 252/50; 252/51; 252/401; 252/402; 252/403; 252/47.5; 585/18
[58] Field of Search ............ 252/47.5, 50, 51, 401, 252/402, 403; 585/18, 379; 525/232, 293

[56] References Cited

U.S. PATENT DOCUMENTS

| | | | |
|---|---|---|---|
| 4,234,435 | 11/1980 | Meinhardt et al. | 252/51.5 A |
| 4,732,942 | 3/1988 | Liu et al. | 252/51.5 A |
| 4,735,736 | 4/1988 | Chung | 252/51.5 A |
| 4,738,797 | 4/1988 | Halpern et al. | 252/51.5 A |
| 4,764,304 | 8/1988 | Kapuscinski et al. | 252/51.5 A |
| 4,863,623 | 9/1989 | Nalesnik | 252/50 |

Primary Examiner—Jacqueline V. Howard
Attorney, Agent, or Firm—Robert A. Kulason; Robert B. Burns; James J. O'Loughlin

[57] ABSTRACT

An additive composition comprising a graft and amine-derivatized copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alpha-monoolefin and from about 0 to 15 mole percent of said polyene, said copolymer having a number average molecular weight ranging from about 5,500 to 50,000 and having grafted thereon at least 1.8 molecules of a carboxylic acid acylating function per molecule of said copolymer and reacting said grafted copolymer with an amino-aromatic polyamine compound from the group consisting of an N-arylphenylenediamine, an aminocarbazole, an aminoindole, an amino-indazolinone, an aminomercaptotriazole, and an amino-perimidine to form said graft and amine-derivatized copolymer, and a lubricating oil composition containing same are provided.

16 Claims, No Drawings

DISPERSANT AND ANTIOXIDANT ADDITIVE AND LUBRICATING OIL COMPOSITION CONTAINING SAME

This is a continuation-in-part of application Ser. No. 07/507,550 filed on Apr. 11, 1990, which is a continuation-in-part of application Ser. No. 07/452,139, filed on Dec. 18, 1989, both now abandoned.

BACKGROUND OF THE INVENTION

This invention relates to a novel bi-functional lubricant additive which provides surprising dispersancy and antioxidant properties when employed in a single grade lubricating oil composition.

Disclosure Statement

Ethylene-propylene copolymers and ethylene-alpha olefin non-conjugated diene terpolymers which have been grafted and derivatized to provide valuable properties in lubricating oil compositions are well known.

U.S. Pat. No. 3,522,180 discloses a method for the preparation of an ethylene-propylene copolymer substrate effective as a viscosity index improver for lubricating oils.

U.S. Pat. No. 4,026,809 discloses graft copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3$ to $C_{28}$ alpha olefin solution grafted with an ethylenically-unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graft monomer of C-vinylpyridine or N-vinylpyrrolidone to provide a dispersant VI improver for lubricating oils.

U.S. Pat. No. 4,234,435 discloses carboxylic acid acylating agents derived from polyalkenes and a carboxylic reactant having a molecular weight from about 1300 to 5000 and having at least 1.3 carboxylic groups per equivalent of polyalkene useful as a lubricant additive.

U.S. Pat. No. 4,320,019 discloses a multipurpose lubricating additive prepared by the reaction of an interpolymer of ethylene and a $C_3$ to $C_8$ alpha-monoolefin with an olefinic carboxylic acid acylating agent to form an acylating reaction intermediate which is then reacted with an amine.

U.S. Pat. No. 4,340,689 discloses a process for grafting a functional organic group onto an ethylene copolymer or an ethylene-propylene-diene terpolymer.

U.S. Pat No. 4,357,250 discloses a reaction product of a copolymer and an olefin carboxylic acid via the "ene" reaction followed by a reaction with a monoamine-polyamine mixture.

U.S. Pat No. 4,382,007 discloses a dispersant—VI improver prepared by reacting a polyamine-derived dispersant with an oxidized ethylene-propylene polymer or ethylene-propylene diene terpolymer.

U.S. Pat. No. 4,144,181 discloses polymer additives for fuels and lubricants comprising a grafted ethylene copolymer reacted with a polyamine, polyol or hydroxyamine and finally reacted with an alkaryl sulfonic acid.

U.S. Pat. No. 4,863,623 discloses multi-functional grafted and derivatized copolymers which provide viscosity index improvement, dispersancy and antioxidant properties in a multi-grade lubricating oil composition.

Co-pending U.S. application Ser. No. 07/345,265 filed on May 1, 1989 discloses a grafted olefin copolymer of 300 to 3500 molecular weight which has been derivatized with a amino-aromatic polyamine compound.

The disclosures in the foregoing patents which relate to VI improvers and dispersants for lubricating oils; namely, U.S. Pat. Nos. 3,522,180, 4,026,809, 4,089,794, 4,137,185, 4,144,181, 4,146,489, 4,234,435, 4,320,019, 4,340,689, 4,357,250, 4,382,007 and 4,863,623 are incorporated herein by reference.

An object of this invention is to provide a novel derivatized graft copolymer composition.

Another object of the invention is to provide a bi-functional lubricant additive effective for imparting dispersancy and antioxidant properties to a single grade lubricating oil composition.

A further object is to provide a novel lubricating oil composition containing the graft copolymer additive of the invention as well as to provide concentrates of the novel additive of invention.

SUMMARY OF THE INVENTION

The novel reaction product of the invention comprises an ethylene copolymer or terpolymer of a $C_3$ to $C_{10}$ alpha-monoolefin and optionally a non-conjugated diene or triene, having a number average molecular weight ranging from about 5,500 to 50,000 on which has been grafted, in the absence of a solvent, an ethylenically unsaturated carboxylic function in the ratio of at least 1.8 molecules of said carboxylic function per molecule of said copolymer or terpolymer which is then further derivatized with an amino-aromatic polyamine compound from the group consisting of:

(a) an N-arylphenylenediamine represented by the formula:

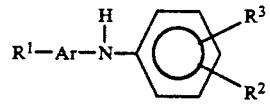

in which Ar is aromatic and $R^1$ is H, —NHaryl, —N-Harylalkyl, a branched or straight chain radical having from 4 to 24 carbon atoms that can be alkyl, alkenyl, alkoxyl, aralkyl alkaryl, hydroxyalkyl or aminoalkyl, $R^2$ is —$NH_2$, —$(NH(CH_2)_n$—$)_m$—$NH_2$, —$CH_2$—$(CH_2)$—$NH_2$, $CH_2$—aryl—$NH_2$—aryl—$NH_2$ in which n and m has a value from to 1 to 10, and $R^3$ is hydrogen, alkyl, alkenyl, alkoxyl, aralkyl, alkaryl, having from 4 to 24 carbon atoms, (f) an aminoperimidine represented by the formula:

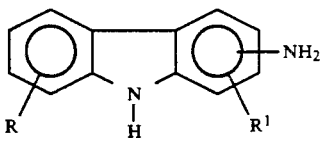

in which R and R¹ represents hydrogen or an alkyl or alkenyl, radical having from 1 to 14 carbon atoms, (c) an aminoindole represented by the formula:

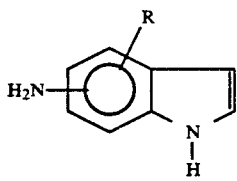

in which R represents hydrogen or an alkyl radical having from 1 to 14 atoms, (d) an amino-indazolinone represented by the formula:

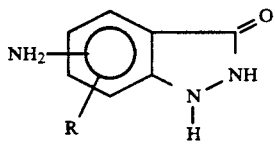

in which R is hydrogen or an alkyl radical having from 1 to 14 carbon atoms, (e) an aminomercaptotriazole represented by the formula:

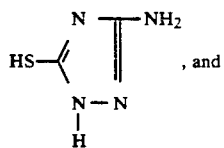

(f) an aminoperimidine represented by the formula:

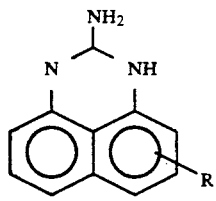

in which R represents hydrogen or an alkyl radical having from 1 to 14 atoms.

The novel lubricant of the invention comprises an oil of lubricating viscosity and an effective dispersant and antioxidant amount of the novel reaction product. This unique product is specifically useful for a single grade lubricating oil composition.

Concentrates of the reaction product of the invention are also contemplated.

DETAILED DESCRIPTION OF THE INVENTION

The polymer or copolymer substrate employed in the novel additive of the invention may be prepared from ethylene and propylene or it may be prepared from ethylene and a higher olefin within the range of $C_3$ to $C_{10}$ alpha-monoolefins.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bi-cyclo compounds. Representative dienes include 1,4-hexadiene, 1,4-cyclohexa-diene, dicyclopentadiene, 5-ethylidene-2-norbornene, 5-methylene-2-norbornene, 1,5-heptadiene, and 1,6-octadiene. A mixture of more than one diene can be used in the preparation of the interpolymer. A preferred non-conjugated diene for preparing a terpolymer of interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-$3a,4,7,7a$-tetrahydroindene, 1-isopropylidenedicyclopentadiene, dehydro-isodioyolopenta-diene, and 2-(2-methylene-4-methyl-3-pentenyl)[2.2.1] bicyclo-5-heptene.

The polymerization reaction used to form the polymer substrate is generally carried out in the presence of a catalyst in a solvent medium. The polymerization solvent may be any suitable inert organic solvent that is liquid under reaction conditions for solution polymerization of monoolefins which is generally conducted in the presence of a Ziegler type catalyst. Examples of satisfactory hydrocarbon solvents include straight chain paraffins having from 5 to 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be mixture of one or more of the foregoing hydrocarbons. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40 to 45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha monoolefin copolymers may consist of from about 15 to 80 mole percent ethylene and from about 20 to 85 mole percent propylene or higher monoolefin with the preferred mole ratios being from about 25 to 75 mole percent ethylene and from about 25 to 75 mole percent of a $C_3$ to $C_{10}$ alpha monoolefin with the most preferred proportions being from 25 to 55 mole percent propylene and 45 to 75 mole percent ethylene.

Terpolymer variations of the foregoing polymers may contain from about 0.to 10 mole percent of a nonconjugated diene or triene.

The starting polymer substrate for preparing the additive of the invention, that is, the ethylene copolymer or terpolymer, is an oil-soluble, substantially linear, rubbery material having a number average molecular weight above about 80,000. Many polymerization processes produce high molecular weight polymers having molecular weights substantially above 80,000 and commonly ranging from 100,000 to 300,000 molecular weight and above. These high molecular weight polymers which provide viscosity index improvement properties when employed in multi-grade lubricating oil compositions must be modified in order to provide a dispersant-antioxidant additive specifically suitable for single grade motor oil compositions. For the purposes of this invention, the high molecular weight polymer substrates must be substantially reduced in molecular weight or substantially degraded to the prescribed molecular weight range in order to be useful for the purposes intended.

High molecular weight polymer substrates or interpolymers are available commercially such as those containing from about 40 to about 60 mole percent ethylene units and about 60 to about 40 mole percent propylene units. Examples are "Ortholeum 2052" and "PL-1256" available from E. I. duPont deNemours and Co. The former is a terpolymer containing about 48 mole percent ethylene units, 48 mole percent propylene units and 4 mole percent, 1,4-hexadiene units, having an inherent viscosity of 1.35. The latter is a similar polymer with an inherent viscosity of 1.95. The viscosity average molecular weights of these polymers are on the order of 200,000 and 280,000, respectively.

The terms polymer and copolymer are used generically to encompass ethylene copolymers, terpolymers or interpolymers. These materials may contain minor amounts of other olefinic monomers so long as their basic characteristics are not materially changed.

An ethylenically unsaturated carboxylic acid material is grafted onto the prescribed polymer backbone. These materials which are attached to the polymer contain at least one ethylenic bond and at least one, preferably two, carboxylic acid or its anhydride groups or a polar group which is convertible into said carboxyl groups by oxidation or hydrolysis. Maleic anhydride or a derivative thereof is preferred. It grafts onto the ethylene copolymer or terpolymer to give two carboxylic acid functionalities. Examples of additional unsaturated carboxylic materials include chlormaleic anhydride, itaconic anhydride, or the corresponding dicarboxylic acids, such as maleic acid, fumaric acid and their monoesters.

The reduction of the molecular weight of the starting ethylene copolymer having a molecular weight above 80,000 to a molecular weight ranging from 5,500 to 50,000 (this molecular weight range corresponds to about 300-25,000 cSt kinetic viscosity of a 37% concentrate of the finished dispersant) and the grafting of the ethylenically unsaturated carboxylic acid material onto the copolymer may be accomplished simultaneously or it may be accomplished sequentially in any order. If done sequentially, the ethylene copolymer may first be degraded to the prescribed molecular weight and then grafted or, conversely, the grafting may be effected onto the high molecular weight copolymer and the resulting high molecular weight grafted copolymer then reduced in molecular weight. Alternatively, grafting and reduction of the high molecular weight copolymer may be done simultaneously.

Reduction of the molecular weight of the high molecular weight ethylene copolymer to the prescribed molecular weight range, whether grafted, during grafting or prior to grafting, is conducted in the absence of a solvent or in the presence of a base oil, using a mechanical shearing means. Generally, the ethylene copolymer is heated to a molten condition at a temperature in the range of 250° C. to 450° C. and it is then subjected to mechanical shearing means until the copolymer is reduced to the prescribed molecular weight range. The shearing may be effected by forcing the molten copolymer through fine orifices under pressure or by other mechanical means.

The grafting of the ethylenically unsaturated carboxylic acid material onto the copolymer either before or after the ethylene copolymer is reduced in molecular weight or during the shearing of the copolymer may be conducted in the presence of a free radical initiator.

The amount of the carboxylic acid material that is grafted onto the prescribed polymer backbone is critical. Thus, at least 1.8 molecules of the carboxylic acid material must be reacted with each molecule of the polymer backbone. It is preferred to react the two or more moles of the carboxylic acid material with each equivalent amount of the polymer. Broadly, the carboxylic acid material should be employed in the ratio from 1.8 to 5 molecules per molecule of the polymer backbone with a preferred ratio being from 2 to 5 molecules and a still more preferred ratio being from 2.25 to 4 molecules. Highly effective additive materials have from 2.5 molecules to 3.5 molecules of the carboxylic acid material or maleic anhydride grafted onto each polymer molecule.

The free-radical initiators which may be used are peroxides, hydroperoxides, and azo compounds and preferably those which have a boiling point greater than about 100° C. and decompose thermally within the grafting temperature range to provide free radicals. Representative of these free-radical initiators are azobutyronitrile and 2,5-dimethyl-hex-3-yne-2,5 bis-tertiary-butyl peroxide. The initiator is used in an amount of between about 0.005% and about 1% by weight based on the weight of the reaction mixture solution. The grafting is preferably carried out in an inert atmosphere, such as under nitrogen blanketing. The resulting polymer intermediate is characterized by having carboxylic acid acylating functions within its structure.

The grafted reduced polymer possessing carboxylic acid acylating functions is reacted with an aminoaromatic polyamine compound from the group consisting of:

(a) an N-arylphenylenediamine represented by the formula:

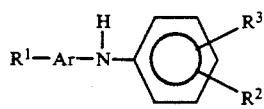

in which Ar is aromatic and $R^1$ is hydrogen, —NH—Aryl, —NH— Arylkyl, a branched or straight chain radical having from 4 to 24 carbon atoms that can be alkyl, alkenyl, alkoxyl, aralkyl, alkaryl, hydroxyalkyl or aminoalkyl, $R^2$ is $NH_2$, $-(NH(CH_2)_n-)_m-NH_2$, $CH_2-(CH_2)_n-NH_2$, $-aryl-NH_2$, in which n and m has a value from 1 to 10, and $R^3$ is hydrogen, alkyl, alkenyl, alkoxyl, aralkyl, alkaryl having from 4 to 24 carbon atoms, (b) an aminocarbazole represented by the formula:

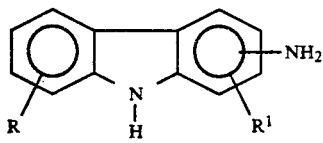

in which R and $R^1$ represent hydrogen or an alkyl, alkenyl, or alkoxyl radical having from 1 to 14 carbon atoms, (c) an aminodole represented by the formula:

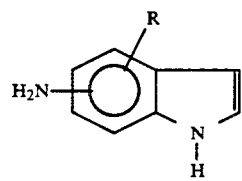

in which R represents hydrogen or an alkyl radical having from 1 to 14 carbon atoms, (d) an amino-indazolinone represented by the formula:

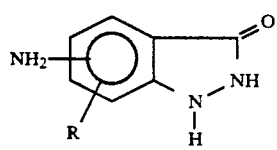

in which R is hydrogen or an alkyl radical having from 1 to 14 carbon atoms, (e) an aminomercaptotriazole represented by the formula:

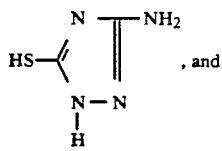

(f) an aminoperimidine represented by the formula:

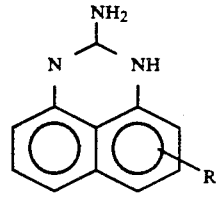

in which R represents hydrogen or an alkyl or alkoxyl radical having from 1 to 14 carbon atoms.

Particularly preferred N-arylphenylenediamines are the N-phenylphenylenediamines, for example, N-phenyl-1,4-phenylenediamine, N-phenyl-1,3-phenylenediamine, N-phenyl-1,2-phenylenediamine, N-naphthylphenylenediamine, N-phenyl-naphthalenediamine and N'-aminopropyl-N-phenylphenylenediamine.

The reaction between the polymer substrate intermediate having grafted thereon carboxylic acid acylating function and the prescribed amino-aromatic polyamine compound is conducted by heating a solution of the polymer substrate under inert conditions and then adding the amino-aromatic polyamine compound to the heated solution generally with mixing to effect the reaction. It is convenient to employ an oil solution of the polymer substrate heated to 140° C. to 175° C. while maintaining the solution under a nitrogen blanket. The amino-aromatic polyamine compound is added to this solution and the reaction is effected under the noted conditions.

The following examples illustrate the preparation of the novel reaction product additive of the invention and include comparison examples.

EXAMPLE I (Comparison Example)

Preparation of Dispersant-Antioxidant From Ethylene-Propylene Copolymer Solution Grafted With About 3.8 Molecules Maleic Anhydride Per Polymer Molecule A 62.5 weight percent mixture of ethylene-propylene copolymer solution grafted with about 3.8 molecules maleic anhydride per polymer molecule in oil (600 g) was charged into a 300 mL 4-neck kettle along with 100 P Pale oil (600 g). The kettle was equipped with a mechanical stirrer, thermometer, thermocouple, and nitrogen inlet and heated to 160° C. Next, N-phenyl-p-phenylenediamine (28 g, 0.153 moles) was added along with Surfonic N-40 (30 g, 0.076 moles). The reaction temperature was maintained at 160° C. for 3 hours. The product (an approximately 30% concentrate) analyzed as follows: %N=0.37 (0.34 calc.), Total Acid Number (TAN) =1.90, and Total Base Number (TBN)=6.08.

EXAMPLE II

The Mechanical/Thermal Shearing Preparation of Dispersant-Antioxidant From Ethylene-Propylene Copolymer The ethylene-propylene copolymer of about 100,000 number average molecular weight was chopped and processed through an extruder in a molten state at a temperature near 400° C. Just prior to entering the extruder screw, maleic anhydride was mixed with the molten polymer and the polymer exiting from the die face of the extruder was grafted with an average of 5 molecules maleic anhydride per polymer molecule. The ethylene-propylene copolymer grafted with 5 moles maleic anhydride per polymer chain (1000 g) was dissolved in 100 P Pale oil (1691 g) in a 4000 mL 4-neck kettle at 160° C. The kettle was equipped with a mechanical stirrer, thermometer, thermocouple, and nitrogen inlet. Next, N-phenyl-p-phenylenediamine (44.5 g, 0.242 moles) was added along with Surfonic N-60 (80 g). The reaction temperature was maintained at 160° C. for 6 hours. The product (an approximately 37% concentrate) analyzed as follows: %N=0.37 (0.24 calc.), Total Base Number (TBN)=7.4, and Kinetic Viscosity (100° C.)=23,008 cSt.

EXAMPLE III

The Synthesis of Dispersant-Antioxidant From Ethylene-Propylene

Copolymer Grafted With an Average of 3.8 Molecules Maleic

Anhydride Per Copolymer Molecule

A 62.5 weight percent mixture of ethylene-propylene copolymer grafted with an average of 3.8 molecules of maleic anhydride per polymer molecule in oil (400 g) was charged into a 3000 mL 4-neck kettle along with 100 P Pale oil (400 g). The kettle was equipped with a mechanical stirrer, thermometer, thermocouple, and nitrogen inlet and heated to 160° C. Next alkylated N-phenyl-p-phenylenediamine (20 g, 0.066 moles) was added along with Surfonic N-40 (20 g). The reaction temperature was maintained at 160° C. for 6 hours. The product (an approximately 31% concentrate) analyzed as follows: %N=0.30 (0.17 calc.), Total Acid Number (TAN)=4.0, Total Base Number (TBN)=0.1, and Kinetic Viscosity (100° C.)=712 cSt.

EXAMPLE IV

The Synthesis of Dispersant-Antioxidant From Ethylene-Propylene

Copolymer Grafted With an Average of 3.8 Molecules Maleic

Anhydride Per Copolymer Molecule Using a Mixture of Amines

A 62.5 weight percent mixture of ethylene-propylene copolymer grafted with an average of 3.8 molecules maleic anhydride per copolymer molecule in oil (1200 g) was charged into a 4000 mL 4-neck kettle along with 100 P Pale oil (1200 g). The kettle was equipped with a mechanical stirrer, thermometer, thermocouple, and nitrogen inlet and heated to 160° C. Next, N-phenyl-p-phenylenediamine (17.3 g, 0.094 moles) and N,N-dimethylaminopropylamine (9.6 g, 0.094 moles) was added along with Surfonic N-40 (60 g). The reaction temperature was maintained at 160° C. for 6 hours. The product (an approximately 31% concentrate) analyzed as follows: %N=0.31 (0.42 calc.), Total Acid Number (TAN)=2.1, Total Base Number (TBN)=3.1, and Kinetic Viscosity (100° C.)=1382 cSt.

EXAMPLE V (Comparison Example)

The Synthesis of Dispersant-Antioxidant From Ethylene-Propylene

Copolymer Grafted With an Average of 1.5 Molecules Maleic

Anhydride per Copolymer Molecule

A 62.5 weight percent mixture of ethylene-propylene copolymer grafted with an average of 1.5 molecules maleic anhydride per copolymer molecule in oil (1431.5 g) was charged into a 4000 mL 4-neck kettle along with 100 P Pale oil (957.4 g). The kettle was equipped with a mechanical stirrer, thermometer, thermocouple, and nitrogen inlet and heated to 160° C. Next, N-phenyl-p-phenylenediamine (18.4 g, 0.099 moles) was added along with Surfonic N-40 (71.5 g). The reaction temperature was maintained at 160° C. for 6 hours. The product (an approximately 37% concentrate) analyzed as follows: %N=0.12 (0.11 calc.), Total Acid Number (TAN)=1.8, Total Base Number (TBN)=0.2, and Kinetic Viscosity (100° C.)=1486 cSt.

EXAMPLE VI

The Mechanical/Thermal Shearing Preparation of Dispersant-Antioxidant

From Ethylene-Propylene Copolymer Utilizing a

Simple Reaction Vessel

The ethylene-propylene copolymer grafted with an average of about 10 molecules maleic anhydride per copolymer molecule (592 g) was dissolved in 100 P Pale oil (2370 g) at 160° C. This was done in a 3000 mL 4-neck kettle was equipped with a mechanical stirrer, thermometer, thermocouple, and nitrogen inlet. The temperature was slowly raised to 325° C. and held for 1 hour. Next, N-phenyl-p-phenylenediamine (29.0 g, 0.163 moles) was added along with Surfonic N-60 (47 g). The reaction temperature was maintained at 160° C. for 6 hours. The product (an approximately 25% concentrate) analyzed as follows: %N=0.29 (0.27 calc.), Total Acid Number (TAN)=0.6, Total Base Number (TBN)=2.5, Kinetic Viscosity=501 cSt.

EXAMPLES VII TO XI

Derivatized graft polymers are prepared employing the polymer and procedure described in Example I employing the following amino-aromatic polyamines:
Example VII: Aminocarbazole
Example VIII: Aminoindole
Example IX: Aminoperimidine
Example X: Aminomercaptotriazole
Example XI: N-phenyl-1,3-phenylenediamine The prescribed graft and derivatized reduced polymer of the invention are useful as additives for lubricating oils. They provide highly effective dispersancy and antioxidant properties efficiently and economically to single grade lubricating oils. They can be employed in a variety of oils of lubricating viscosity including natural and synthetic lubricating oils and mixtures thereof. The novel additives can be employed in crankcase lubricating oils for spark-ignited and compression-ignited internal combustion engines. The compositions can also be used in gas engines, or turbines, automatic transmission fluids, gear lubricants, metal-working lubricants, hydraulic fluids and other lubricating oil and grease compositions. Their use in motor fuel compositions is also contemplated.

The base oil may be a natural oil including liquid petroleum oils and solvent-treated or acid-treated mineral lubricating oils of the paraffinic, naphthenic and mixed paraffinic-naphthenic types.

In general, the lubricating oil composition of the invention will contain the novel reaction product in a concentration ranging from about 0.1 to 30 weight percent. A concentration range for the additive ranging from about 0.5 to 15 weight percent based on the total weight of the oil composition is preferred with a still more preferred concentration range being from about 1 to 7.5 weight percent.

Oil concentrates of the additives may contain from about 1 to 50 weight percent of the additive reaction product in a carrier or diluent oil of lubricating oil viscosity.

The novel reaction product of the invention may be employed in lubricant compositions together with conventional lubricant additives. Such additives may include additional dispersants, detergents, antioxidants, pour point depressants, anti-wear agents and the like.

The novel additive reaction product of the invention was tested for its effectiveness as a dispersant and as an antioxidant in a formulated lubricating oil composition. In all of the examples, the polymer substrate was similar comprising about 60 mole percent ethylene and 40 mole percent propylene. The base lubricating oil used in the dispersancy test was a typical formulated lubricating oil as represented by the values set forth in Table I.

TABLE I

| Component | Parts By Weight |
|---|---|
| Solvent neutral oil A | 75.25 |
| Solvent neutral oil B | 21.64 |
| Zinc Dialkyldithiophosphate | 1.22 |
| 4.4'dinonyldiphenylamine | .39 |
| Overbased magnesium sulfonate | 1.50 |
| Silicone anti-foamant | 150 PPM |
| Product | 4-10 |
| Analyses | |
| Viscosity Kin 40C CS | 30.4 |
| Viscosity Kin 100C CS | 5.33 |
| Pour Point, F. | +10 |
| Ash Sulfated, % D874 | 0.88 |
| Phosphorus, % X-Ray | 0.12 |
| Sulfur, % X-Ray Total | 0.32 |
| Zinc, % X-Ray | 0.13 |

Oil had a sp. gr. 60/60° F. of 0.858-0.868; Vis 100° F. 123-133; Pour Point 0° F. Oil B had a sp. gr. 60/60° F. of 0.871-0.887; Vis. 100° F. 325-350; Pour Point +10° F. Zinc salt is a salt of mixed alcohols-isopropanol and $P_2S_5$ product as described in U.S. Pat. No. 3,292,181. The overbased magnesium sulfonate had a TBN of 395 and is a salt of branched $C_{20}$ to $C_{40}$ monoalkybenzene sulfuric acid (MV 530-540) together with about 10% magnesium carbonate, 14% magnesium hydroxide and 4% magnesium sulfate.

The dispersant properties of the additive-containing oil are determined in the Bench Sludge Dispersancy Test. Dispersancy of a lubricating oil is determined relative to three references which are the results from three standard blends tested along with the unknown. The test additives were blended into a formulated oil containing no dispersant. The additive reaction product was employed in the oil at concentrations of 4 and 6.5 weight percent polymer solution. The numerical value of the test results decreases with an increase in effectiveness.

TABLE II

BENCH SLUDGE DISPERSANCY TEST

| Additive | Results[1] | |
|---|---|---|
| | 4% Conc. | 6.5% Conc. |
| Example I (Comparison Example) | 25 | 21 |
| Premium Grade Commercial Motor Oil | 46 | 20 |
| Example II | 18 | 21 |
| Example III | 21 | 13 |
| Example IV | 25 | 19 |
| Example V (Comparison Example) | 26 | 22 |
| Reference[2] | 34 | 18 |

[1]All Bench Sludge Test results are the average of duplicate runs.
[2]Alkenylsuccinimide dispersant.

The antioxidant properties of the novel reaction product in a lubricating oil was determined in the Bench Oxidation Test. In this test, the additive reaction product is blended into solvent neutral oil (S.U.S. at 100° F. of 130) at a nitrogen concentration of 0.10 weight percent. The mixture is continuously stirred while being heated accompanied by bubbling with air. Samples are withdrawn periodically for analysis by Differential Infrared Absorption (DIR) to observe changes in the intensity of the carboxyl vibration band at 1710 cm-1. A low carboxyl vibration band intensity indicates higher thermal-oxidative stability of the sample.

TABLE III

BENCH OXIDATION TEST

| Additive | Result[1] |
|---|---|
| Example 1 | 2.9 |
| Reference[2] | 20.7 |

[1]A number below 7 indicates the antioxidant properties of the blend.
[2]Alkenylsuccinimide dispersant The test results above demonstrate substantial improvements in antioxidant properties due to incorporation of the novel reaction product of the invention in an oil composition as compared to the results obtained from a known commercial motor oil composition.

ASTM SEQUENCE VE TEST

The ASTM Sequence VE test is used to evaluate the performance of engine oils in protecting engine parts from sludge and varnish deposits and valve train wear due to low temperature "stop and go" operation. The test uses a Ford 2.3 L four-cylinder Ranger truck engine. The engine is cycled through three test stages, requiring four hours to complete, for 288 hours or 72 cycles. The Sequence VE engine test results shown in Table 2 were run in a 30W single grade formulation.

TABLE IV

| Sequence VE Engine Test Results | | | | | |
|---|---|---|---|---|---|
| Dispersant | AS[1] | AV | PSV | % ORC | % OSC |
| Reference[2,3] (2.4% Active) | 7.1 | 4.3 | 6.8 | 39.8 | 33.6 |
| Example I (2.0% Active) | 9.5 | 5.0 | 7.3 | 5.0 | 0.0 |
| Example IV (2.0% Active) | 9.5 | 4.8 | 7.1 | 23.0 | 0.0 |
| Example I (1.3% Active) mixed with Alkenyl Succinimide Dispersant (1.1% Active) | 9.4 | 6.5 | 6.9 | 0.0 | 0.0 |
| Limits | 9.0 min | 5.0 min | 6.5 min | 15.0 max | 20.0 max |

[1]AS, AV, PSV, ORC, and OSC denote: average sludge, average varnish, piston skirt varnish, oil ring clogging, and oil screen clogging, respectively.
[2]average of seven runs
[3]Alkenyl Succinimide Dispersant The MWM-B engine test is used to evaluate the performance of diesel engine oils. The test uses a one cylinder engine that runs for 50 hours. The piston is rated for cleanliness utilizing a merit system. The rating scale goes from 0 to 80, with 80 being a perfectly clean piston. The engine test results below show that a 3.8 mole maleic anhydride per copolymer chain graft level provides superior diesel engine performance as compared to a 1.5 mole maleic anhydride per polymer chain graft level for the same MW polymer. The dispersants were evaluated in a SAE 40W single grade formulation at 6.5 weight percent:

| DISPERSANT | MWM-B ENGINE TEST RESULT |
|---|---|
| Example 1 | 60 Merits |

| DISPERSANT | MWM-B ENGINE TEST RESULT |
|---|---|
| (3.8 Molecules Maleic Anhydride) Example V (1.5 Molecules Maleic Anhydride) | 54 Merits |

Haze in a lubricating oil composition represents a serious quality problem. The prescribed additives of the invention which were prepared by a variety of processes were tested for their effect on haze in oils in a Hazitron instrument. The Hazitron is an instrument which is used to give a relative indication of light scattering caused by haze. The method is based on measurements of transmitted light by the sample placed in two positions of the sample compartment. A cuvette filled with the sample is placed in the extreme right side of the sample compartment, adjacent to the measuring photocell and the instrument is balanced with the numbered dial set on "0". The cuvette is then shifted to the extreme left side of the sample compartment and the instrument is re-balanced using the numbered dial. The reading on the numbered dial minus the cuvette correction number gives the Hazitron number. The higher the number the hazier the sample. The measurements were done on the polymer concentrates diluted to 10 volume percent in SNO-150. The results below show that samples prepared from mechanical/thermal shearing have much better clarity than samples produced from solution polymerization.

The dispersant-antioxidant additive of the instant invention derives its effectiveness as an antioxidant from the use of the specific N-arylphenylenediamine reactants described. It is contemplated, however, that valuable economies may be achieved when the prescribed reaction products of the invention are used in combination with other reaction products prepared from different amines. More specifically, grafted copolymers having the prescribed molecular weight range and prescribed graft level may be reacted with an amine having in its structure one primary amine group and either a tertiary amine group or a highly hindered secondary amine group. Examples of such amines include aminopropylmorpholine, aminoethylmorpholine, N',N'-dimethylaminopropylamine, N',N'-dimethylethylamine, N-methylaminopropylpiperzine.

The following table illustrates the use of such mixed reaction products.

| DISERSANT | HAZITRON NUMBER |
|---|---|
| Example I (Solution Polymerization) | 80 |
| Example II (Mechanical/Thermal Shearing) | 19 |
| Example IV (Solution Polymerization w/Mixed Amine System) | 44 |
| Example VI (Mechanical/Thermal Shearing) | 25 |

The foregoing test results demonstrate that the antioxidant moiety can be mixed in all proportions with other polyamines on the polymer backbone and produce a useful product. This technique was used to lower the Hazitron Number of a product derived from solution polymerization from 80 to 44 without loss of engine performance.

What is claimed is:

1. A process for the preparation of an additive composition prepared by the steps comprising:

(A) reacting a polymer prepared from ethylene and at least one $C_3$ to $C_{10}$ alpha-monoolefin and, optionally, a polyene selected from non-conjugated dienes and trienes comprising from about 15 to 80 mole percent of ethylene from about 20 to 85 mole percent of said $C_3$ to $C_{10}$ alpha-monoolefin and from about 0 to 15 mole percent of said polyene, said polymer having a number average molecular weight ranging from 1,000 to 45,000 above 80,000, with an excess in equivalence of an olefinic carboxylic acid acylating agent per equivalent weight of said polymer, said process comprising heating said polymer to a molten condition at a temperature in the range of 250° C. to 450° C. and, simultaneously, or sequentially in any order, reducing the molecular weight of said polymer with mechanical shearing means and grafting said olefinic carboxylic acylating agent onto said polymer, thereby producing a grafted, reduced molecular weight polymer having a number average molecular weight ranging from 5,500 to 50,000 and having at least 1.8 molecules of said carboxylic acid acylating function grafted onto each copolymer molecule of said reduced polymer, and (B) reacting said grafted reduced polymer in (A) with an amino-aromatic polyamine compound selected from the group consisting of:

(a) an N-arylphenylenediamine represented by the formula:

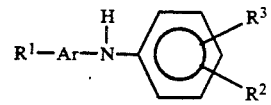

in which Ar is an aromatic hydrocarbon radical and $R^1$ is hydrogen, —NH—aryl, NH—arylalkyl, a branched or straight chain radical having from 4 to 24 carbon atoms that can be alkyl, alkenyl, alkoxyl, aralkyl alkaryl, hydroxyalkyl or aminoalkyl, $R^2$ is $NH_2$, $-(NM(CH_2)_n-)-_m-NH_2$, $CH_2-(CH_2)_n-NH_2$, $CH_2-aryl-NH_z$ in which n and m has a value from 1 to 10, and $R^3$ is hydrogen, alkyl, alkenyl, alkoxyl, aralkyl, alkaryl having 4 to 24 carbon atoms, (b) an aminocarbazole represented by the formula:

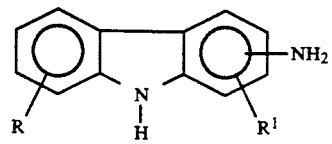

in which R and $R^1$ represent hydrogen or an alkyl or alkenyl, radical having from 1 to 4 carbon atoms, (c) an aminoindole represented by the formula:

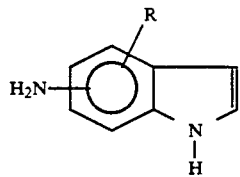

in which R represents hydrogen or an alkyl radical having from 1 to 14 carbon atoms, (d) an amino-indazolinone represented by the formula:

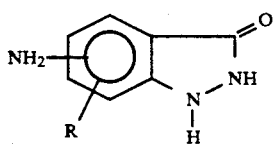

in which R is hydrogen or an alkyl radical having from 1 to 14 carbon atoms, (e) an aminomercaptotriazole represented by the formula:

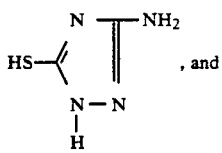

(f) an aminoperimidine represented by the formula:

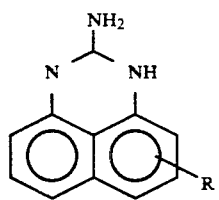

in which R represents hydrogen or an alkyl, alkenyl, or alkoxyl radical having from 1 to 8 carbon atoms.

2. A process according to claim 1 in which said reaction comprises heating said polymer to a molten condition, mixing said olefinic carboxylic acylating agent with said polymer and subjecting said mixture in the absence of a solvent to mechanical shearing means to graft said olefinic carboxylic acylating agent onto said polymer and reduce the molecular weight of said polymer to a range from 5,500 to 50,000.

3. A process according to claim 1 in which said grafted reduced polymer has a number average molecular weight from about 6,000 to 20,000.

4. A process according to claim 1 in which said grafted reduced polymer has a number average molecular weight from about 7,000 to 15,000.

5. A process according to claim 1 in which said grafted reduced polymer comprises from about 25 to 75 mole percent ethylene and from about 25 to 75 mole percent of a $C_3$ to $C_8$ alpha-monoolefin.

6. A process according to claim 1 in which said polymer comprises from about 40 to 65 mole percent ethylene and from about 35 to 60 mole percent of propylene.

7. A process according to claim 4 which contains from about 0.1 to 10 mole percent of a polyene.

8. A process according to claim 1 in which said olefinic carboxylic acid acylating agent is maleic anhydride.

9. A process according to claim 1 in which said olefinic carboxylic acid acylating agent is itaconic anhydride.

10. A process according to claim 1 in which said amino-aromatic polyamine compound is an N-aryl or N-alkylaryl substituted phenylenediamine.

11. A process according to claim 9 in which said amino-aromatic polyamine compound is an N-phenyl-phenylene-diamine.

12. A process according to claim 9 in which said amino-aromatic polyamine compound is aminothiazole.

13. A process according to claim 1 in which said grafted reduced polymer has from about 2 to 5 molecules of said carboxylic acid acylating function per molecule of said polymer.

14. A process according to claim 1 in which grafted reduced polymer has from about 2.25 to 4 molecules of said carboxylic acid acylating function per molecule of said polymer.

15. A process according to claim 1 in which said grafted reduced polymer has from about 2.5 to 3.75 molecules of said carboxylic acid acylating function per molecule of said reduced polymer.

16. A process according to claim 1 in which the mechanical shearing means for the reaction between said polymer and said carboxylic acid acylating agent is an extruder.

* * * * *

UNITED STATES PATENT AND TRADEMARK OFFICE
CERTIFICATE OF CORRECTION

PATENT NO. : 5,075,383

DATED : December 24, 1991

INVENTOR(S) : Cyril A. Migdal, et al.

It is certified that error appears in the above-identified patent and that said Letters Patent is hereby corrected as shown below:

Column 14, line 13, after "ranging", delete --from 1,000 to 45,000--;

Column 14, line 51, delete "$z$" and insert therefor --$_2$--.

Signed and Sealed this

Twenty-first Day of June, 1994

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

| | | |
|---|---|---|
| PATENT NO. | : 5,075,383 | Page 1 of 1 |
| APPLICATION NO. | : 07/628050 | |
| DATED | : December 24, 1991 | |
| INVENTOR(S) | : Migdal et al. | |

It is certified that error appears in the above-identified patent and that said Letters Patent is hereby corrected as shown below:

On the Title Page, in the [*] Notice section, please delete the current text and replace with:

--
The portion of the term of this patent, subsequent to the termination of U.S. Patent 4,863,623, has been disclaimed.
--

Signed and Sealed this

Twenty-ninth Day of August, 2006

JON W. DUDAS
*Director of the United States Patent and Trademark Office*